2 Sheets—Sheet 1.
C. B. HUTCHINSON.
MACHINE FOR CUTTING AND JOINTING STAVES, &c.
No. 7,069.  Patented Feb. 5, 1850.
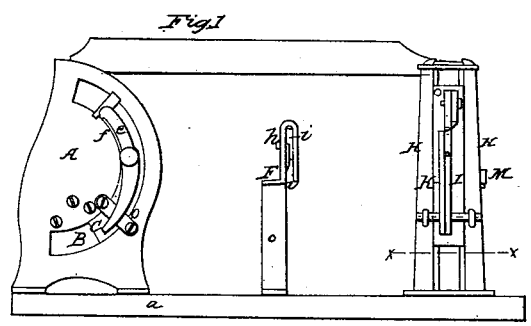
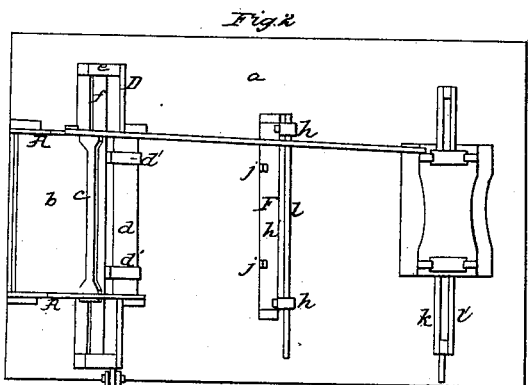
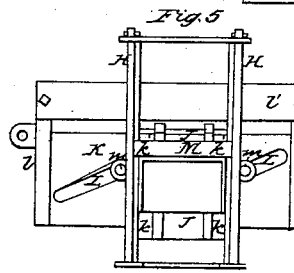
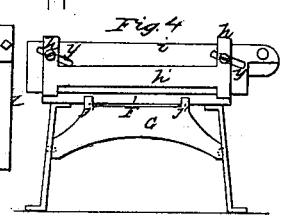
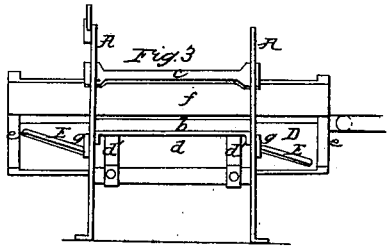

2 Sheets—Sheet 2.
C. B. HUTCHINSON.
MACHINE FOR CUTTING AND JOINTING STAVES, &c.
No. 7,069. Patented Feb. 5, 1850.
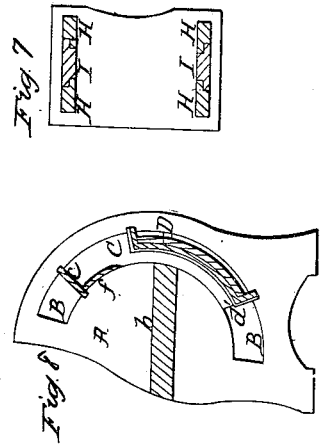
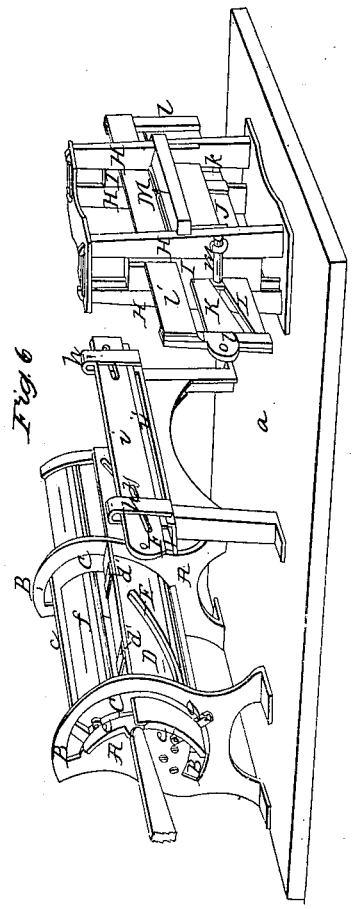

UNITED STATES PATENT OFFICE.

C. B. HUTCHINSON, OF WATERLOO, NEW YORK.

MACHINE FOR CUTTING STAVES.

Specification of Letters Patent No. 7,069, dated February 5, 1850.

*To all whom it may concern:*

Be it known that I, CHAS. B. HUTCHINSON, of Waterloo, in the county of Seneca and State of New York, have invented a new and useful Improvement in the Machine for Cutting and Jointing Staves, and Cutting the Heads of Barrels, Casks, &c., which is described as follows, reference being had to the annexed drawings of the same, making part of this specification in which—

Figure 1, is a side elevation of the machine. Fig. 2, is a top or bird's eye view of ditto. Fig. 3, is a front elevation of the apparatus for cutting the staves. Fig. 4, is a front elevation of the apparatus for jointing the staves. Fig. 5, is a front elevation of the apparatus for cutting the heads of barrels. Fig. 6, is a perspective view of the apparatus for cutting and jointing the staves, and cutting the heads of barrels, casks &c. combined in one machine. Fig. 7, is a horizontal section of the apparatus for cutting the heads of barrels, casks, &c. at the line $x$ $x$ of Fig. 1, and Fig. 8, is a vertical transverse section of the apparatus for cutting the staves.

Similar letters in the figures refer to like parts.

The nature of my invention and improvement consists in arranging upon a suitable platform, and in close proximity, apparatus for cutting and jointing the staves, and cutting the heads of barrels, casks, &c., of such form and construction as will cut the staves to the proper curvature and joint their edges with a drawing stroke, and cut the heads upon a like principle, with correctness and dispatch, smoother and with a thinner knife, than the modes generally employed for these purposes, and less liable to check the staves; and also in applying to the apparatus, minor improvements, which will be made apparent in this specification.

To enable others skilled in the art to make and use my invention I will proceed to describe its construction and operation.

A are the side or cheek pieces of the apparatus for cutting the staves, and having flanges, on their lower edges, by which they are secured to the platform or floor $a$ and connected together about midway between their upper and lower edges, by a flanged oblong plate on which is placed a corresponding formed plank, forming a rest ($b$) for the timber to be cut.

B are semicircular spaces or slots formed in the back part of the side or cheek plates, and scribed from a point a short distance above the rest or table ($b$).

C are segmental plates, fitting and moving in the spaces or slots B, connected together at their upper ends by a rib or brace ($c$), having grooves formed near its extremities, in which the edges of the slots fit, and being bent at right angles at its ends, to form flanges, by which it is secured to the segmental plates C, and connected at their lower ends by a segmental plate ($d$) of a corresponding curvature, having ribs or hoops ($d'$) on its inner surface near each end, and bent at its upper and lower parts on lines radial with the center from which the semicircular spaces or slots B are scribed; the ends of which bent parts, rest against the inner surfaces of the side or cheek pieces A, for guiding the lower ends of the segmental plates C in their movements.

D is a segmental plate passing through corresponding slots in the segmental rims, $c$, having similar formed bars $e$ secured at its ends, which project above the upper edge of said plate, where they are scalloped to receive the ends of a segmental knife ($f$) which extends from one to the other, and is bolted to the same, passing through spaces formed in the segmental plates C at their upper ends next the forward edges of the semicircular slots or spaces B.

E are spiral slots formed in the plate D, near its ends, through which pass at right angles small bars ($g$) secured to the side plates A for giving a spiral motion to the knife, in its movements, said bars ($g$) having notches at their centers in which the edges of the spiral slots fit.

F is the inclined table of the apparatus for jointing the staves, supported on suitable uprights secured to the platform, and having bars $h$ rising from each end, connected together by a cross bar ($h'$) and bent at their centers, and brought down in the form of a fork, so as to form spaces between their surfaces, in which is placed an oblong plate ($i$) rabbeted on its lower edge to receive a knife ($i'$) which is firmly bolted to the same. $y$, $y$, are inclined grooves or slots, formed in the oblong plate through which pass bolts, likewise passing through the forward parts of the bars and secured to the same, for giving the knife a drawing stroke in its movement through the staves.

G is a curved plate, bent at right angles at the lower part of its ends, to form flanges into which are inserted pins, projecting from the insides of the uprights, and also having fingers or projections (J') formed on its upper edge which fit in similar sized spaces in the edge of the table for forcing the wood up to the knife.

H are upright posts of the apparatus for cutting heading, attached to a plate secured to the platform (a) at their lower ends, and connected together at their upper ends by a horizontal plate; said posts being arranged in pairs opposite each other immediately back of the jointing apparatus, and in such relation to each other as to form spaces between the edges of each pair, which edges are rabbeted so as to form tongues on the same.

I are oblong plates tongued or rabbeted on their edges in a corresponding manner to those on the uprights, between which they move, and connected together by a horizontal plate (k), on edge, bent at right angles at its upper and lower edges and provided with projecting ears at these parts, midway between the sides of the same.

J is a ribbed oblong plate, arranged on the face of the last mentioned one, midway between the sides of the same, a small space being left between them, and bent at right angles under and over the edges of the same, and secured firmly by screws to the right angled upper and lower edges of the plate (k).

K is an oblong plate arranged immediately back of the plate k, its upper and lower edges being in contact with the right angled projecting edges of the said plate (k) and passing through slots in the rabbeted plates I and having ribs or bars (l) secured to its ends, projecting above its upper edge to the upper ends of which bars, is secured a knife (l') passing through other slots in the plates I.

L are inclined slots formed near the ends of the oblong plate K, through which pass, horizontal bolts or bars m secured to the sides of the uprights H, and having nuts at their centers fitting in the slots L which operate on the same, for giving the knife a drawing stroke in its passage across.

M is a horizontal table upon which the timber to be cut is placed, resting on a flanged plate secured to the upright posts H.

Operation: A vibrating motion being given to the knife frames of the different apparatus, by pitman rods and cranks, the timber from which the staves are to be cut, is placed on the table (b) of the apparatus for cutting and is forced by springs, hand or otherwise against the ribs (d') situated on an arc of a circle, just so much greater than the arc which the knife is situated, as to form a space between the two, corresponding with the thickness of the intended stave to be cut, when the knife f, is elevated to its full extent, and on the return stroke of the pitman rod, the knife will be caused to pass through the same in a spiral line, by means of the spiral grooves E and bars g on the sides of the plates A and cut a stave of the required curvature of the cask or barrel (the center from which the semicircular slots B are scribed, forming the center of the circle upon which the knife moves and corresponding with the center of the said cask or barrel) and in the next, and in every other similar vibration of the knife, a similar effect will be produced. After the staves have been thus cut they will be placed on the inclined table F of the apparatus for jointing, and their edges will be successively forced under the knife by the fingers (j') of the hinged plate (j), which is moved by hand or other power at each revolution of the crank, to which the pitman rod of the knife frame is attached, and a proper joint will be given to the same. The timber from which the heads to be cut, is placed on the table M, of the heading apparatus, and forced against the ribs of the plate J situated back of the knife just far enough to correspond with the thickness of the intended head to be cut, at the proper stages, and the heading will be cut by a similar drawing stroke, to that attained in the machine for jointing, effected by the inclined slots L and bar or bolt m.

What I claim as my invention and desire to secure by Letters Patent is—

The mode of cutting staves to the required curvature, with a spiral drawing stroke, by means of the segmental plate D, having bars or ribs (e) at its ends, to which the knife f is attached, segmental rims C, moving in the segmental slots B formed in the side plates A, and containing slots through which the segmental plates D move, spiral slots E in the plates D, and bars (g) passing through the same substantially as herein set forth.

CHARLES B. HUTCHINSON.

Witnesses:
  ISAAC MOSHER,
  CHARLES D. MORGAN.